United States Patent [19]

Suda et al.

[11] Patent Number: 5,771,413
[45] Date of Patent: Jun. 23, 1998

US005771413A

[54] FOCUS DETECTING APPARATUS

[75] Inventors: Yasuo Suda; Keiji Ohtaka; Keiji Nagata, all of Yokohama; Kenichiro Yamashita, Matsudo; Terutake Kadohara; Hitoshi Onoda, both of Yokohama, all of Japan

[73] Assignee: Canon Kabushiki Kaisha, Tokyo, Japan

[21] Appl. No.: 773,009

[22] Filed: Dec. 24, 1996

[30] Foreign Application Priority Data

Dec. 28, 1995 [JP] Japan .................................. 7-354107

[51] Int. Cl.$^6$ .................................................. G03B 13/36
[52] U.S. Cl. ...................................... 396/114; 396/111
[58] Field of Search ................................... 396/111, 114

[56] References Cited

U.S. PATENT DOCUMENTS

| | | | |
|---|---|---|---|
| 4,147,417 | 4/1979 | Mandler | 354/25 |
| 4,808,808 | 2/1989 | Karasaki et al. | 250/201 |
| 4,859,842 | 8/1989 | Suda et al. | 250/201 |
| 4,878,078 | 10/1989 | Koyama et al. | 354/402 |
| 4,954,701 | 9/1990 | Suzuki et al. | 250/201.8 |
| 4,992,819 | 2/1991 | Ohtaka et al. | 354/408 |
| 5,212,514 | 5/1993 | Goto | 354/402 |
| 5,258,804 | 11/1993 | Suda | 354/406 |
| 5,428,420 | 6/1995 | Akashi et al. | 354/408 |
| 5,597,999 | 1/1997 | Kinba et al. | 250/201.7 |

FOREIGN PATENT DOCUMENTS

| | | |
|---|---|---|
| 61-15112 | 1/1986 | Japan . |
| 62-173412 | 7/1987 | Japan . |
| 1-120518 | 5/1989 | Japan . |

Primary Examiner—Russell E. Adams
Attorney, Agent, or Firm—Fitzpatrick, Cella, Harper & Scinto

[57] ABSTRACT

A focus detecting apparatus includes an optical unit provided on an image plane side of an objective lens for detecting a focus state of the objective lens, the optical unit forming a plurality of light quantity distributions, a photoelectrical changing unit having a plurality of elements for outputting a relative positional signal between the plurality of light quantity distributions, and a circuit for detecting a focus state of the objective lens. The optical unit includes a reflecting mirror having a light condensing property for reflecting a light beam from the objective lens to form an object image on a predetermined surface, a secondary imaging lens having at least a pair of lenses for causing the object image formed on the predetermined surface to be reimaged on the photoelectrical changing unit and a pair of apertures having aperture portions respectively corresponding to the pair of lenses. When the photoelectrical changing unit is reversedly projected by the secondary imaging lens and the reflecting mirror, the elements corresponding to the direction of arrangement of the pair of apertures of the photoelectrical changing unit are arranged so that a peripheral portion of the elements is not parallel to the center of the arrangement of the elements.

9 Claims, 12 Drawing Sheets

FOCUS DETECTING APPARATUS

BACKGROUND OF THE INVENTION

1. Field of the Invention

This invention relates to a focus detecting apparatus suitable for use in a photographic camera, a video camera, an observation apparatus, etc., and to an optical apparatus using the same, and is particularly suitable when dividing the pupil of an objective lens (a phototaking lens) into a plurality of areas, forming light quantity distributions regarding a plurality of object images by the use of light beams passing through the respective areas, and finding the relative positional relation between the plurality of light quantity distributions to thereby two-dimensionally or continuously detect the in-focus state of the objective lens relative to the plurality of areas over a wide area in a phototaking range.

2. Related Background Art

Focus detecting systems of the light receiving type utilizing a light beam passed through an objective lens include a system called an image deviation system (a phase difference detecting system).

FIG. 16 of the accompanying drawings is a schematic view of the optical system (optical apparatus) of a focus detecting apparatus using the conventional art image deviation system. In FIG. 16, the reference numeral 101 designates an objective lens (a phototaking lens) for effecting phototaking, the reference numeral 102 denotes a half-transmitting main mirror, the reference numeral 103 designates a focusing screen, the reference numeral 104 denotes a pentagonal prism, the reference numeral 105 designates an eyepiece, the reference numeral 106 denotes a sub-mirror, the reference numeral 107 designates film (a photosensitive surface), and the reference numeral 108 denotes a focus detecting apparatus.

In FIG. 16, a light beam from an object, not shown, is transmitted through the objective lens 101, whereafter it is upwardly reflected by the main mirror 102 and forms an object image on the focusing screen 103. The object image formed on the focusing screen 103 is visually confirmed by a photographer or an observer through the eyepiece 105 via several times of reflection by the pentagonal prism 104.

On the other hand, part of the light beam which has passed through the objective lens 101 to the main mirror 102 is transmitted through the transmitting portion of the main mirror 102, is downwardly reflected by the sub-mirror 106 and is directed to the focus detecting apparatus 108.

FIG. 17 of the accompanying drawings is an illustration in which only the objective lens 101 and focus detecting apparatus 108 in FIG. 16 are taken out and developed to illustrate the principle of focus detection.

In the focus detecting apparatus 108 of FIG. 17, the reference numeral 109 designates a field mask disposed near the predetermined focal plane of the objective lens 101, i.e., a plane conjugate with the film surface 107, the reference numeral 110 denotes a field lens disposed also near the predetermined focal plane, the reference numeral 111 designates a secondary imaging system comprising two lenses 111-1 and 111-2, the reference numeral 112 denotes a photoelectrical changing element including two sensor arrays 112-1 and 112-2 disposed correspondingly to and rearwardly of the two lenses 111-1 and 111-2, the reference numeral 113 designates an aperture having two opening portions 1131-1 and 113-2 disposed corresponding to the two lenses 111-1 and 111-2, and the reference numeral 114 denotes the exit pupil of the objective lens 101 including two divided areas 114-1 and 114-2.

The field lens 110 has the function of imaging the opening portions 113-1 and 113-2 of the aperture 113 near the areas 114-1 and 114-2 in the exit pupil 114 of the objective lens 101, and light beams 115-1 and 115-2 transmitted through the areas 114-1 and 114-2 of the exit pupil 114 may form light quantity distributions regarding the object image on the two sensor arrays 112-1 and 112-2.

The focus detecting apparatus shown in FIG. 17 is what is generally called a phase difference detection system (an image deviation system), and when the imaging point of the objective lens 101 is on the front side of the predetermined focal plane, i.e., on the objective lens 101 side, the light quantity distributions regarding the object images formed on the two sensor arrays 112-1 and 112-2 become close to each other, and when, conversely, the imaging point of the objective lens 101 is on the rear side of the predetermined focal plane, i.e., on the side opposite to the objective lens 101, the light quantity distributions of regarding the object images formed on the two sensor arrays 112-1 and 112-2 become far from each other.

Moreover, the amount of deviation of the light quantity distributions of regarding the object images formed on the two sensor arrays 112-1 and 112-2 is in a certain functional relation with the defocus amount, i.e., the off-focus amount, of the objective lens 101 and therefore, by calculating the amount of deviation by suitable calculating means, the direction and amount of off-focus of the objective lens 101 are detected.

When, in such a focus detecting apparatus of the phase difference detection type, distortion occurs to the secondary image of an object formed on the photoelectrical changing element, accurate focus detection becomes impossible. In contrast, Japanese Patent Application Laid-Open No. 61-15112 discloses a technique for eliminating the adverse effect of any distortion which is allowed in a focus detecting optical system. Also, Japanese Patent Application Laid-Open No. 61-15112 proposes a method of providing a mask adjusted to distortion on the light receiving surface of a photoelectrical changing element, and Japanese Patent Application Laid-open No. 1-120518 proposes this method as it is applied to a multipoint distance measuring system.

In an optical apparatus incorporating therein the conventional art focus detecting apparatus shown in FIG. 16, a light beam necessary for focus detecting is directed to the focus detecting apparatus 108 via the sub-mirror 106. Therefore, the range of an area in the phototaking range in which focus detection is possible is restricted by the size (area) of the sub-mirror 106. The sub-mirror 106 has been particularly difficult to enlarge upwardly from its disposition relation with the main mirror 102 and accordingly, it has been impossible to enlarge the area in which focus detection is possible upwardly above the film 107, i.e., downwardly on the object side.

In FIG. 16, to make the area of the sub-mirror 106 large without interfering with the main mirror 102, it would occur to mind to move the sub-mirror 106 rearwardly. In such a case, however, the position of the predetermined focal plane of the objective lens 101 formed after being reflected by the sub-mirror 106 moves upwardly and therefore, the distance between the predetermined focal plane and the focus detecting system 108 becomes great, and it is necessary to make the field lens in the focus detecting apparatus 108 (the field lens 110 of FIG. 12 of the accompanying drawings) considerably large. This becomes a great hindrance in disposing the focus detecting system at the bottom of a camera.

In order that the field lens may not become large relative to the upwardly moved predetermined focal plane, the field lens can be upwardly moved in accordance with the predetermined focal plane, but if this is done, the field lens will intercept the phototaking light beam and thus, during phototaking, it is necessary to retract the field lens out of the phototaking light beam. To realize this, the mechanical structure becomes very complicated and costly and moreover, it becomes difficult to maintain the accuracy equal to that of the conventional art focus detecting apparatus.

On the other hand, a line sensor is chiefly used as the photoelectrical changing element used in the conventional art focal detecting apparatus, and the area in which focus detection is substantially possible has been merely a very limited area such as a point or a line in the phototaking range.

Some of the conventional art focus detecting apparatuses have a plurality of focus detecting systems so as to enable focus detection to be accomplished in a plurality of areas, but the respective focus detection areas have been isolated from each other and focusing could not be effected on an object lying in the intermediate portion of each focus detection area.

Also, the method of sampling an image in accordance with the distortion of a secondary image as disclosed in Japanese Patent Application Laid-Open No. 61-15112 and Japanese Patent Application Laid-Open No. 1-120518 in order to eliminate the adverse effect of distortion occurring to a focus detecting optical system in a focus detecting apparatus of the phase difference detection type is ensured as to the identity of two secondary images sampled when the objective lens is in the in-focus state.

However, in a non-in-focus state as well, the two secondary images laterally deviated relative to each other have not always been in a sampling area.

That is, when the objective lens is not in focus, the two secondary images do not always move only in the direction of the opening in the photoelectrical changing element and therefore, the photoelectrically converted output in this case is that about different portions on the object. The detection error of defocus increases as the contrast component not orthogonal to the direction in which the images deviate increases, and generally, the direction of the contrast of an object is random therefore, of course, it becomes difficult to find an accurate defocus amount on the basis of the phase difference thereof.

SUMMARY OF THE INVENTION

It is a first object of the present invention to appropriately set each element of optical means for focus detection provided on the image plane side of an objective lens (a phototaking lens) to thereby extend an area in which focus detection is possible, particularly to the upper portion in a phototaking range in any area or/and a plurality of areas in vertical and horizontal directions in a phototaking field even if distortion is present in a focus detecting optical system.

It is a second object of the present invention to provide a focus detecting apparatus which can effect focus detection highly accurately even at any point in a continuous two-dimensional area, and an optical apparatus using the same.

The focus detecting apparatus of the present invention has an optical unit provided on the image plane side of said objective lens for forming a plurality of light quantity distributions regarding an object image by the use of light beams passed through the plurality of different areas of the pupil of said objective lens, a photoelectrical changing unit having a plurality of elements for outputting the relative positional relation between the plurality of light quantity distributions, and a circuit for finding the in-focus state of said objective lens in one or more areas in a phototaking field by the use of a signal from said photoelectrical changing unit, said optical unit having a reflecting mirror having a light condensing property for reflecting the light beam from said objective lens and forming an object image on a predetermined surface, a secondary imaging lens having at least a pair of lenses for causing the object image formed on predetermined surface to be reimaged on said photoelectrical changing unit, and an aperture having at least a pair of openings for limiting the light beam incident on said secondary imaging lens, and is characterized in that the direction of arrangement of the pair of openings in said aperture is a direction along a plane formed by the optical axis of said objective lens and the optical axis after the deflection of the light beam by said reflecting mirror, and the predetermined area of the sensor array of said photoelectrical changing unit is of a shape non-parallel to the plane at a position separate from the plane when it is reversely projected onto the predetermined imaging plane of said objective lens.

DESCRIPTION OF THE PREFERRED EMBODIMENTS

Figure 1:
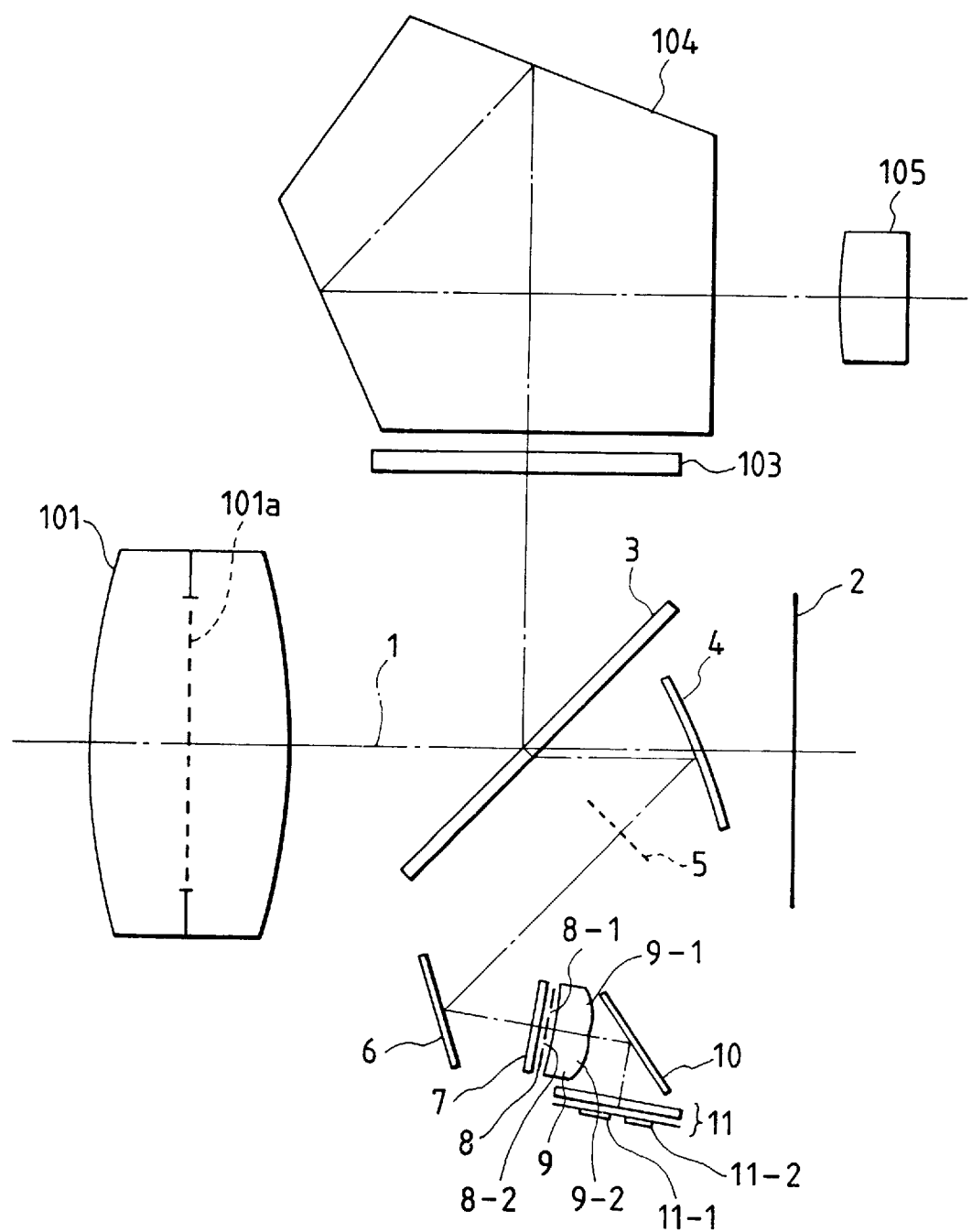
FIG. 1 is a schematic view of the essential portions of Embodiment 1 of the present invention.
Figure 2:
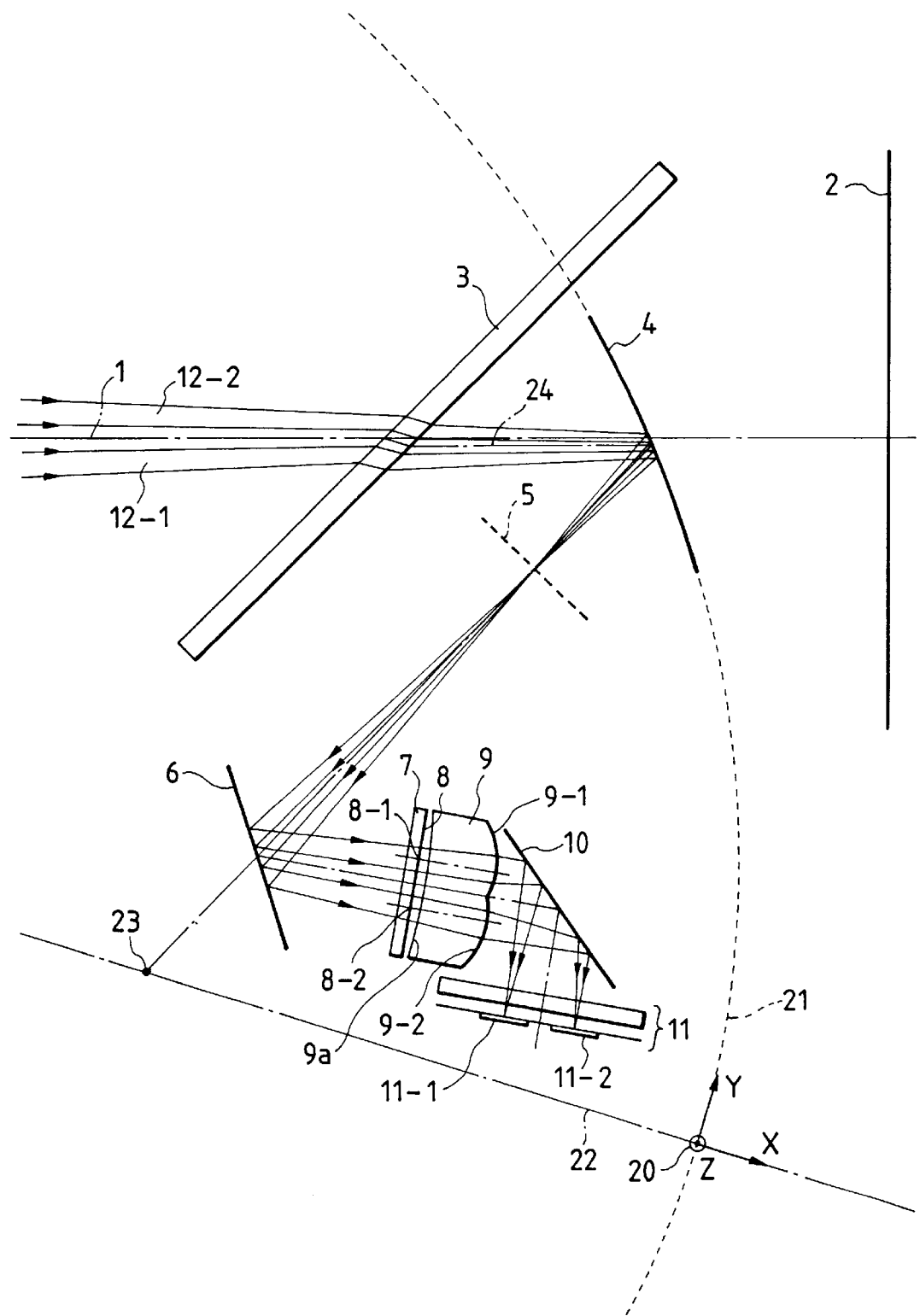
FIG. 2 is an enlarged illustration of a portion of the focus detecting apparatus of FIG. 1.

FIG. 1 is a schematic view of the essential portions of Embodiment 1 in which the focus detecting apparatus of the present invention is applied to an optical apparatus such as a camera, and FIG. 2 is a schematic view of essential portions constituting the focusdetecting apparatus of FIG. 1.

In these figures, the reference numeral 101 designates an objective lens, the reference numeral 1 denotes the optical axis of the objective lens 101, the reference numeral 2 designates film (image pickup surface), the reference numeral 3 denotes a half-transmitting main mirror disposed on the optical axis 1 of the objective lens 101, and the reference numeral 103 designates a focusing screen on which an object image by the objective lens 101 is imaged through the main mirror 3. The reference numeral 104 denotes a pentagonal prism, and the reference numeral 105 designates an eyepiece through which the object image on the focusing screen 103 is observed.

The reference numeral 4 denotes a first reflecting mirror which is disposed obliquely with respect to the optical axis 1 on the imaging plane side of the objective lens 101 and comprises a light condensing concave mirror or an elliptical surface mirror or the like. The reference numeral 5 designates a paraxial imaging plane by the reflecting mirror 4 which is conjugate with the film 2 and on which an object image is formed. The reference numeral 6 denotes a second reflecting mirror, the reference numeral 7 designates an infrared cut filter, the reference numeral 8 denotes an aperture having two openings 8-1 and 8-2, the reference numeral 9 designates a secondary imaging system having two lenses 9-1 and 9-2 disposed correspondingly to the two openings 8-1 and 8-2 in the aperture 8, the reference numeral 10 denotes a third reflecting mirror, and the reference numeral 11 designates a photoelectrical changing element (light receiving means) having two areas sensors 11-1 and 11-2. The first reflecting mirror 4, the second reflecting mirror 6 and the secondary imaging system 9 each constitute an element of optical means.

The first reflecting mirror 4 in the present embodiment has a light condensing curvature so as to project the two openings 8-1 and 8-2 in the aperture 8 onto the vicinity of the exit pupil 101a of the objective lens 101.

Also, the first reflecting mirror 4 has a metallic film such as aluminum or silver deposited by evaporation thereon so that only the necessary portion thereof may reflect light, and serves also as a field mask (regulating means) for limiting a range in which focus detection is effected. On the other reflecting mirrors 6 and 10 as well, only necessary minimum areas are deposited by evaporation for light reflection in order to decrease stray light incident on the photoelectrical changing element 11. Each reflecting mirror has applied thereto regulating means such as by applying a light absorbing paint or the like to an area thereof which does not function as a reflecting surface, or providing a light intercepting member in proximity thereto.

Figure 3:
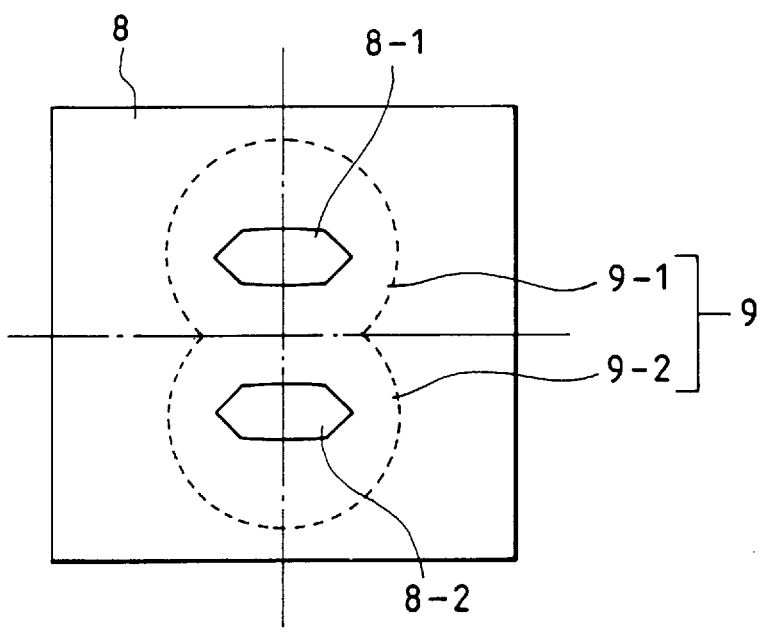
FIG. 3 is an illustration showing the aperture and secondary imaging system of FIG. 1.

FIG. 3 is a plan view of the aperture 8 of FIG. 1. The aperture 8 is of such a construction that two laterally long openings 8-1 and 8-2 are arranged in a direction of a narrow opening width (a vertical direction in the phototaking range). Indicated by a dotted line in FIG. 3 are the lenses 9-1 and 9-2 of the secondary imaging system which are disposed correspondingly to and rearwardly of the openings 8-1 and 8-2 in the aperture 8.

Figure 4:
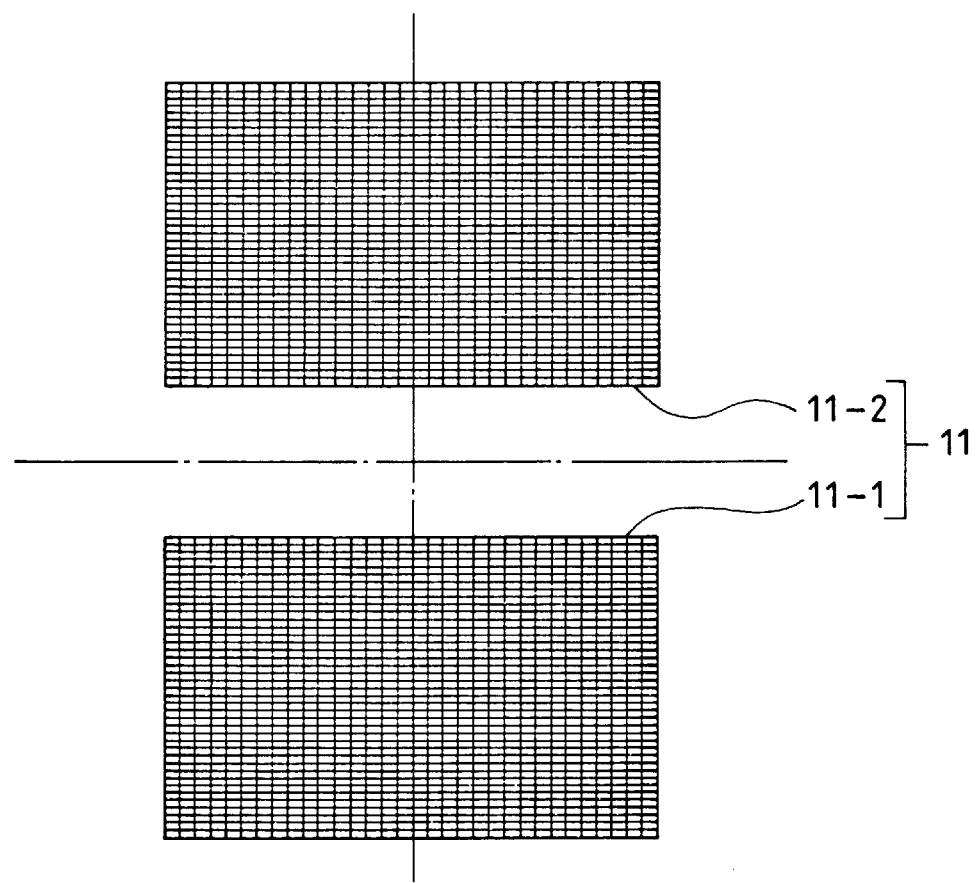
FIG. 4 is an illustration showing the photoelectrical changing element of FIG. 1.

FIG. 4 is a plan view of the photoelectrical changing element 11, and the two areas sensors 11-1 and 11-2 shown in FIG. 1 are two areas sensors 11-1 and 11-2 in which a plurality of pixels are two-dimensionally arranged as shown in this figure.

In the above-described construction, two light beams 12-1 and 12-2 from the phototaking lens 101 of FIG. 1 are transmitted through the main mirror 3, whereafter they are reflected in a direction substantially along the inclination of the main mirror 3 and form an object image on the paraxial imaging plane 5. At this time, the first reflecting mirror 4 is adapted to minutely form on the paraxial imaging plane 5 an object image formed on the image pickup surface 2. The light beam from the object image formed on the paraxial imaging plane 5 is reflected by the second reflecting mirror 6 and again changes its direction, whereafter it passes through the infrared cut filter 7 and the openings 8-1 and 8-2 in the aperture 8 and is condensed by the lenses 9-1 and 9-2 of the secondary imaging system 9, and arrives at the area sensors 11-1 and 11-2 of the photoelectrical changing element 11 via the third reflecting mirror 10.

The light beams 12-1 and 12-2 in FIG. 2 indicate light beams imaged at the center of the film 2, but light beams imaged at other positions arrive at the photoelectrical changing element 11 via a similar route and, as a whole, two light quantity distributions regarding the object image are formed on the area sensors 11-1 and 11-2 of the photoelectrical changing element 11 corresponding to predetermined two-dimensional areas on the film (in the phototaking range) 2.

In the present embodiment, the first reflecting mirror 4 is constructed of a part of a curved surface formed by a quadratic curve being rotated about an axis, and particularly a spheroidal surface is suitably used. In FIG. 2, the surface shape of the first reflecting mirror 4 comprises a part of a spheroidal surface formed by an ellipse 21 having a point 20 as its vertex being rotated about an axis 22, and the focus thereof is set near the central image position 23 on the aperture by the second reflecting mirror 6 and near a point (not shown) on the extension of an optical axis 24 after the transmission through the main mirror 3. The exit pupil position of the objective lens 101 and the entrance position of the secondary imaging system 9 may be substantially imaged in such a manner that the point on the extension of the optical axis 24 is near the exit pupil position of the objective lens 101 (when various objective lenses are interchangeably used, their average exit pupil position).

Thereby, the first reflecting mirror 4 is adapted to function as an ideal field lens. As is apparent from FIG. 2, what is optically used as the first reflecting mirror 4 is an area which does not include the rotational axis and vertex of the spheroidal surface.

The specific shape of the spheroidal surface 4 in the present embodiment can be represented, relative to the coordinate axes of FIG. 2, as follows:

$$x = \frac{h^2/r}{1 + \sqrt{1 - (1+k)(h/r)^2}} \quad (h^2 = y^2 + z^2)$$

$$r = -38.5 \quad k = -0.37$$

r=−38.5 k=−0.37

Supposing an ordinary camera (optical apparatus) and an ordinary objective lens (phototaking lens), the ranges of r and k may preferably be on the order of $-20 \leq r \leq -50$ and $-1 \leq k \leq -0.2$.

Also, in the present embodiment, the light incident side surface (first surface) 9a of the secondary imaging system 9 is made into a concave surface shape to thereby provide such a lens construction that light entering the secondary imaging system 9 is not forcibly refracted, and good and uniform imaging performance is assured over the wide range of the two-dimensional area on the photoelectrical changing element 11.

For the two light quantity distributions regarding the object image obtained in this manner, on the basis of a principle similar to that described as the focus detecting method of the image deviation type according to the prior art, the relative positional relation in the direction of separation, i.e., the vertical direction of the two area sensors 11-1 and 11-2 shown in FIG. 4, is calculated at positions comprising any plurality of elements of the area sensors 11-1 and 11-2, whereby the focus state of the objective lens 101 is two-dimensionally detected in any area in the phototaking range. The first reflecting mirror 4 is retracted out of the phototaking optical path like the main mirror 3, during phototaking.

What should be noted here is the distortion of the object images on the paraxial imaging plane 5 and the photoelectrical changing element 11 resulting from the imaging of the first reflecting mirror 4. As previously described, the first reflecting mirror 4 has convergent power which projects the two openings 8-1 and 8-2 in the aperture 8 near the exit pupil 101a of the objective lens 101, and is provided obliquely with respect to the optical axis 1 and therefore, a large asymmetrical distortion is created on the imaging plane 5 thereof.

Figure 5:
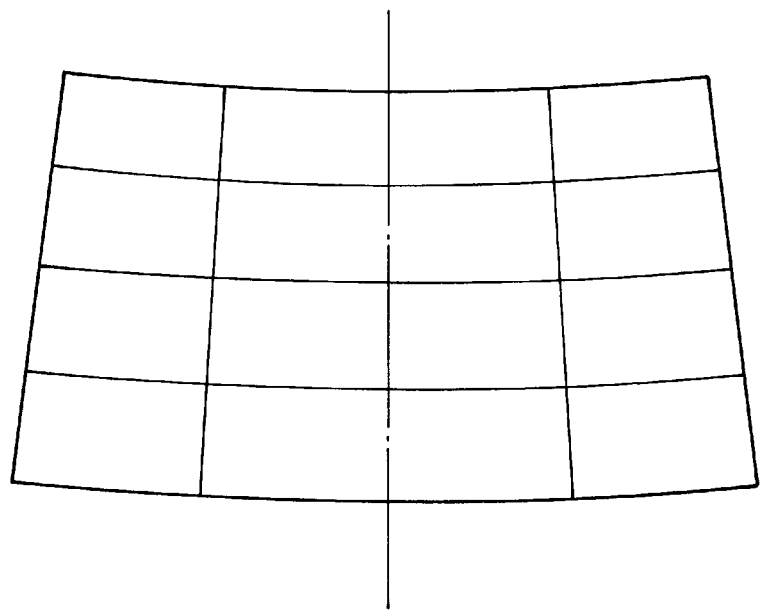
FIG. 5 is an illustration showing the distortion of an image on the imaging plane of FIG. 1.

FIG. 5 is a plan view showing how distortedly rectangular checked figures are imaged on the imaging plane 5 in FIG. 2 by the first reflecting mirror 4 in the present embodiment when the rectangular checked figures are imaged on the film 2 by the objective lens 101, and the upper portion of FIG. 5 is the main mirror 3 side of FIG. 2.

In the present embodiment, in order to suppress the creation of such a distortion of the image to the utmost, the design is made such that the angle formed by the normal at the point of intersection with the optical axis 24 of the first reflecting mirror 4 and the optical axis 24 is made as small as possible and the reflected light beam is reflected in a direction substantially along the main mirror 3, i.e., as forwardly as possible. Accordingly, the angle formed by the ray of light incident along the optical axis and the reflected ray of light thereof is an acute angle. The second reflecting mirror 6 is provided to direct the forwardly reflected light beam to the secondary imaging system 9.

As shown in FIG. 5, the figures rectangularly formed on the film 2 are imaged in a sector narrow at its upper portion and wide at its lower portion on the imaging plane 5 by the first reflecting mirror 4. Thus, if they are reimaged in this state on the photoelectrical changing element 11 by the secondary imaging system 9, distorted images also will be formed on the photoelectrical changing element 11.

Figure 6:
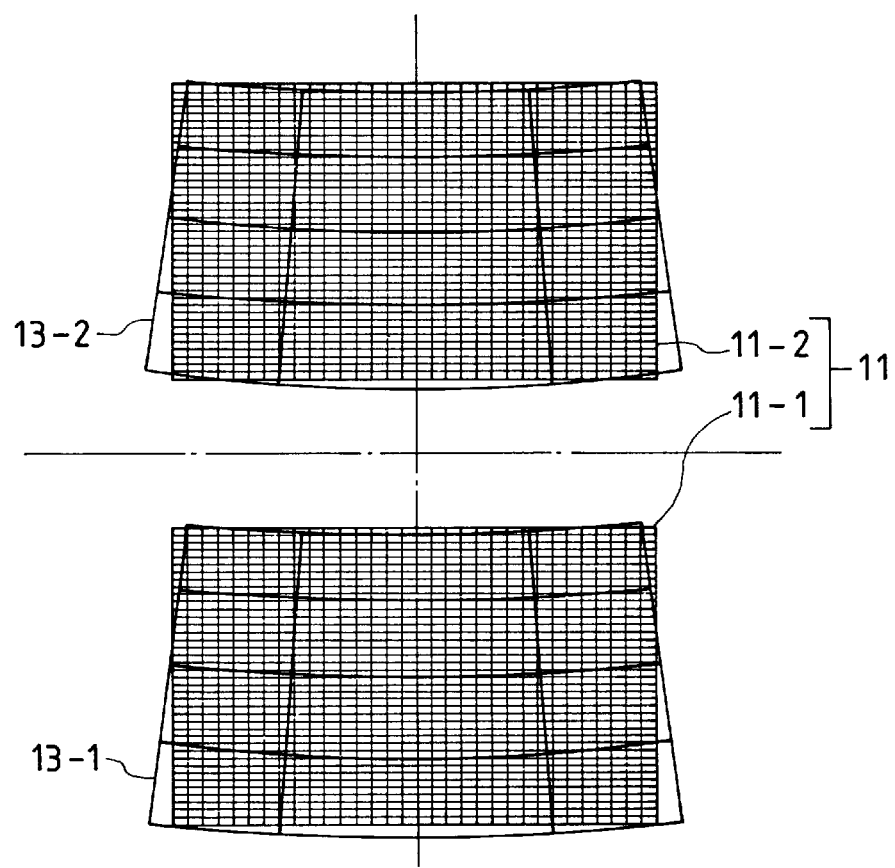
FIG. 6 is an illustration showing the distortion of images on the photoelectrical changing element of FIG. 1.

FIG. 6 is a plan view of the photoelectrical changing element 11 showing that state, and on the area sensors 11-1 and 11-2, rectangles are formed as distorted images as indicated by images 13-1 and 13-2.

It is general that the area sensors are constructed with rectangular pixels regularly arranged in vertical and horizontal directions as shown by the area sensors 11-1 and 11-2 of FIG. 6, and their configurations may usually also be rectangular. In contrast, the fact that the distorted images 13-1 and 13-2 as shown in FIG. 6 are formed means that the images of the two rectangular area sensors 11-1 and 11-2 reversely projected onto the film 2 become conversely distorted and the field of view for effecting focus detection is inclined in the marginal portion thereof.

However, if the two object images formed on the two area sensors 11-1 and 11-2 are equally distorted relative to the area sensors 11-1 and 11-2, it will be no obstacle to the detection of the relative position of the two object images that the field of view is inclined. Regarding the deviation between two object images in the row direction (correlative direction) of the area sensors 11 for detecting the relative position, the output from the photoelectrical changing element can be calculated and corrected by a method similar to that disclosed, for example, in Japanese Patent Application Laid-Open No. 62-173412 and therefore, if there is no deviation between two object images in a direction perpendicular to the row direction (correlative direction) of the area sensors 11, focus detection can be effected well.

Again, in the present embodiment, the two individual object images formed on the two area sensors 11-1 and 11-2 exhibit great distortion, but the difference in the distortion between the row direction (correlative direction) of the area sensors 11 and the direction perpendicular thereto is sufficiently small.

If the difference between the two directions remains and affects focus detection accuracy, a light intercepting member, for example, a mask of aluminum or the like, curved correspondingly to the difference in distortion along each sensor array can be provided on the light receiving surface of each sensor, as disclosed in Japanese Patent Application Laid-Open No. 61-15112, to thereby improve accuracy.

It is also possible to adjust the imaging magnification of each image as a method of correcting the difference in the distortion of the two object images. Specifically, in FIG. 2, the vertex positions (the lens surface vertex positions) of the exit side surfaces of the two lenses 9-1 and 9-2 of the secondary imaging lens 9 along the optical axis can be set so as to differ from each other or the whole of the secondary imaging lens 9 can be set obliquely with respect to the optical axis and the imaging magnifications of the two lenses 9-1 and 9-2 can be varied. Also, by the photoelectrical changing element 11 being inclined instead of being provided perpendicular to the optical axis, the adjustment of the magnifications and distortions of the two object images can be effected.

A description will now be provided of the characteristic that in the present embodiment, at a position separate from a plane formed by the optical axis 1 of the objective lens 101 and the optical axis after the deflection of the light beam by the reflecting mirror 4 when a predetermined area comprising a plurality of elements of the photoelectrical changing element is reversely projected onto the predetermined imaging plane of the objective lens, said predetermined area is made non-parallel to said plane.

Figure 7:
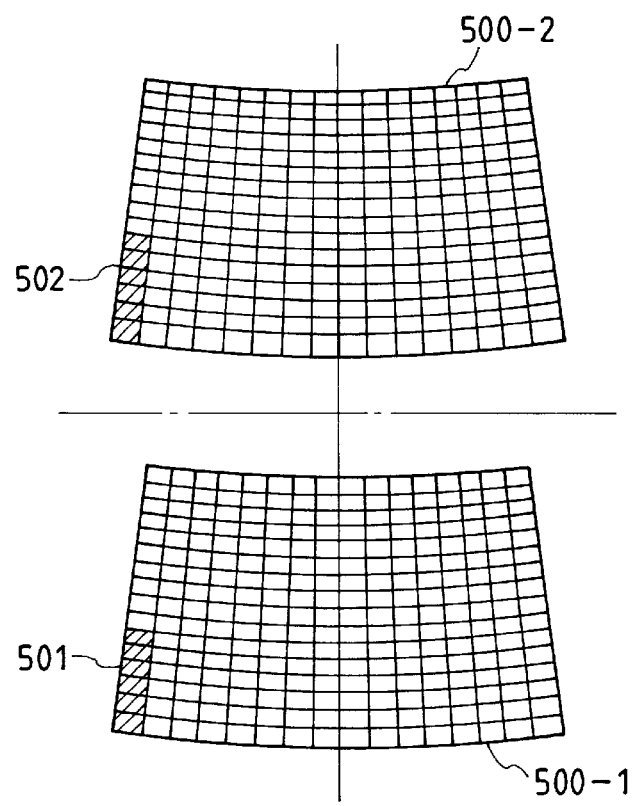
FIG. 7 is a plan view of an area sensor in which sensor arrays are arranged along the distortion of secondary images.

If, for an optical apparatus having the focus detecting apparatus according to the present invention, area sensors 500-1 and 500-2 arranged on the photoelectrical changing element 11 along the distortion of a secondary image as shown in FIG. 7 and, for example, with the hatched areas 501 and 502 of the sensor array as partial openings, the positional relation between secondary images projected thereon is relatively compared by the use of the output from the photoelectrical changing element 11, the discrimination between the in-focus and non-in-focus of the objective lens 101 will be possible.

However, if in this focus detecting apparatus, the direction of movement of the secondary images by the defocus of the objective lens 101 is not along the areas 501 and 502, then accurate detection of the defocus amount will be impossible.

Figure 8:
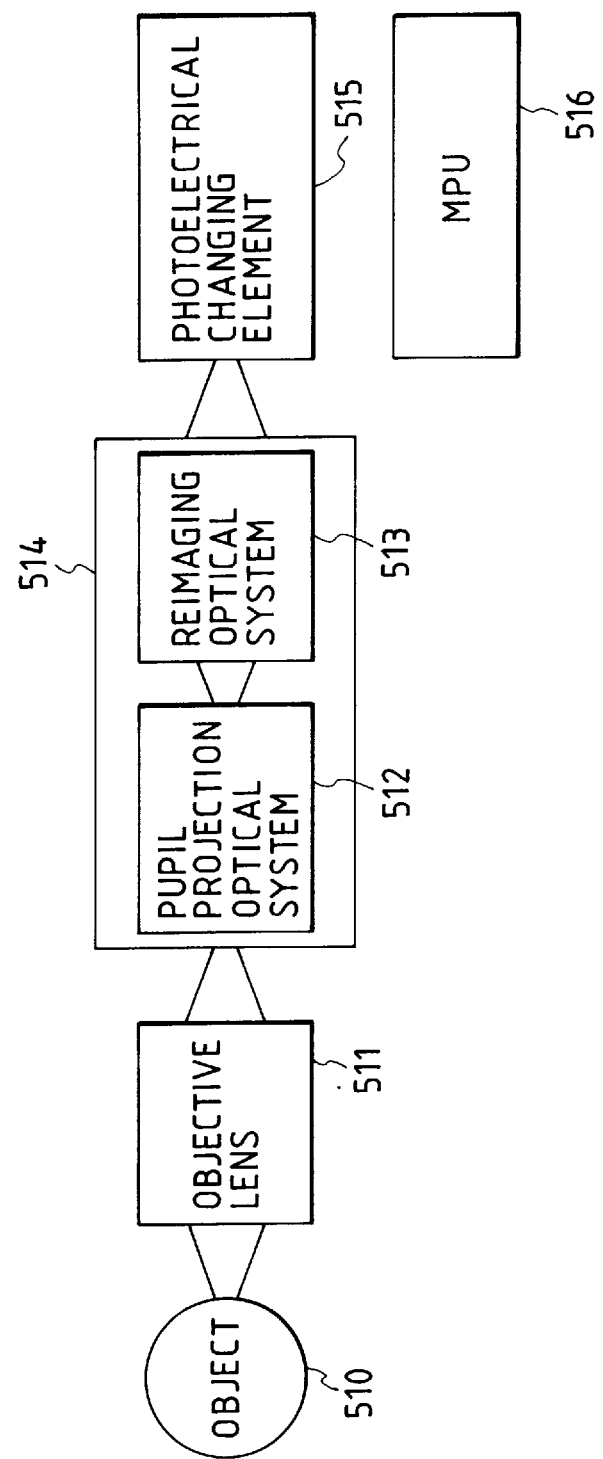
FIG. 8 is an illustration schematically showing the construction of a focus detecting optical system.

FIG. 8 is a block diagram of essential portions generally showing the role of the entire focus detecting apparatus of the phase difference detection type to illustrate the direction of movement of the secondary image.

In FIG. 8, the reference numeral 510 designates an object, the reference numeral 511 denotes an objective lens, the reference numeral 514 designates a focus detecting optical system, and the reference numeral 515 denotes a photoelectrical changing element. The focus detecting optical system 514 includes a pupil projection optical system 512 comprising an optical element such as a field lens or a field mirror, and a reimaging optical system (secondary imaging system) 513 comprised of a pair of imaging lenses or the like.

The reference numeral 516 designates a microprocessing unit for processing the output from the photoelectrical changing element 515. The factors by which distortion occurs to the secondary image of the object 510 projected onto the photoelectrical changing element 515 reside in the pupil projection optical system 512 and the reimaging optical system 513. Particularly, the tracing of the rays of light is discretely effected with respect to these optical systems, whereby the natures thereof with regard to distortion are found.

If, with regard to a case wherein the distortion of the secondary image is attributable to the reimaging optical system, the movement of the secondary image resulting from the defocus of the objective lens is substituted for by the primary image plane and considered, it can be understood that on the primary image plane, the object image moving accurately in the direction of arrangement of the stop openings of the reimaging optical system is distorted by the reimaging optical system and is projected onto the photoelectrical changing element, and it is seen that the movement of the secondary image is in a direction along the distortion. When, conversely, the distortion of the secondary image is attributable to the pupil projection optical system, it can be understood that there is already a distorted image on the primary image plane and the reimaging optical system having a parallax is projecting this image onto the photoelectrical changing element without distortion and therefore, it is seen that the direction of movement of the secondary image resulting from the defocus of the objective lens is the direction of arrangement of the stop openings of the reimaging optical systems.

In individual focus detecting optical systems having distortion in a secondary image, to know the main factor of the distortion simply, one may think as follows. First, a grating on the light receiving surface of a photoelectrical changing element is assumed and this is reversely projected toward an objective lens through only a reimaging optical system. Thereupon, the image of the grating which is not affected by a pupil projection optical system appears there. If the grating on the light receiving surface is assumed to be an opening for sampling the secondary image, that image is an equivalent opening for sampling an object side image to the reimaging optical system.

If this grating creates distortion and is reversely projected, the factor of the distortion created in the secondary image of the object resides in at least the reimaging optical system, and if conversely, the grating is reversely projected without any distortion, the factor of the distortion created in the secondary image of the object resides in only the pupil projection optical system.

Figure 9:
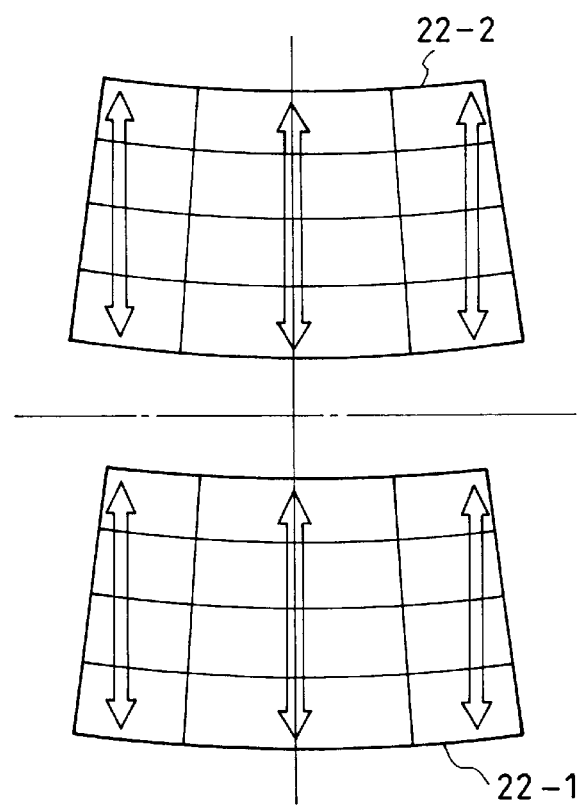
FIG. 9 is a plan view showing the direction of movement of secondary images.

Now, turning back to FIG. 7, consider the main factor of the distortion by this focus detecting optical system. First, it is seen from simple optical consideration that the grating on the photoelectrical changing element reversely projected through only the reimaging optical system suffers considerably little from distortion. Accordingly, it can be explained that the factor of the distortion created in the secondary image resides in the pupil projection optical system and the distortion of the imaging plane of the reflecting mirror 4 shown in FIG. 1 is intactly projected onto the photoelectrical changing element. As a result, the direction of movement of the secondary image becomes the direction of the arrows indicated in FIG. 9. If the sensor array is set along the arrows, it will be possible to compare the relative positional relation of the secondary image thereby and accurately find the defocus amount of the objective lens.

Also, in other words, when in this focus detecting optical system having distortion in the secondary image, this main factor is the pupil projection optical system, the projected image onto the distance measuring field, i.e., the predetermined imaging plane of the sensor array is distortedly disposed, whereby the detection of an accurate defocus amount becomes possible.

Figure 10:
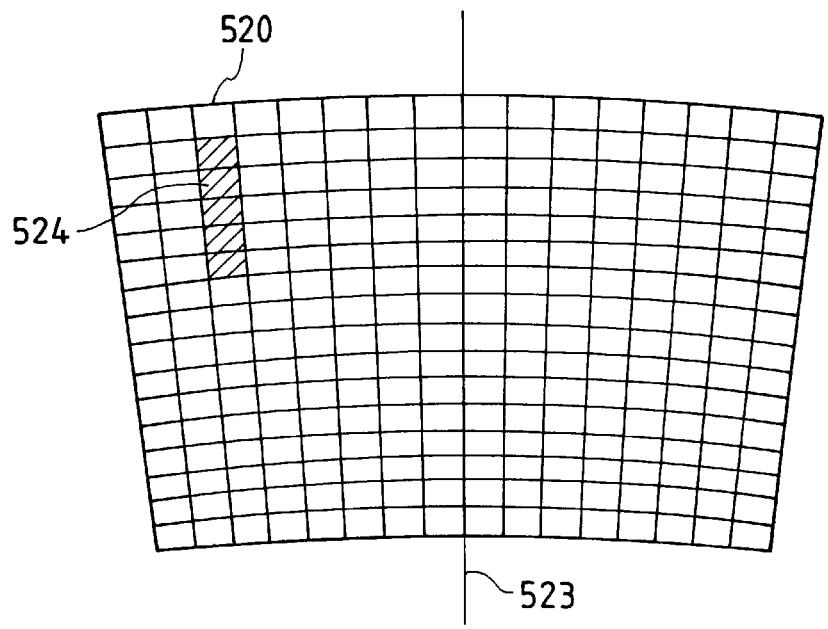
FIG. 10 shows the disposition of a distance measuring field on a film surface.
Figure 11:
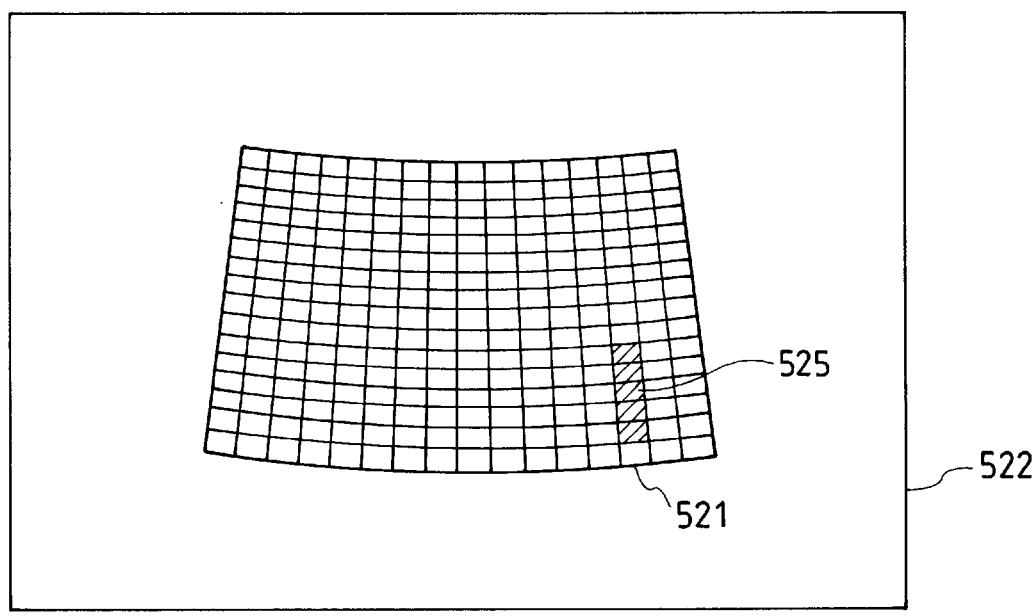
FIG. 11 shows the disposition of the distance measuring field in a finder field.

FIG. 10 shows the distance measuring field on the paraxial imaging plane 5 of the objective lens, and FIG. 11 shows the distance measuring field when the object is seen through a finder optical system through which the object image can be observed as an erect image. In these figures, the reference numeral 522 designates a finder field, and the reference numerals 520 and 521 denote the whole distance measuring fields, and for example with respect to hatched distance measuring fields 524 and 525 thereof, the corresponding output of the photoelectrical changing element is processed and the imaged state of the objective lens at this position is distorted, whereby on the photoelectrical changing element, each sensor array can be arranged in the direction of movement of the secondary image resulting from the defocus of the objective lens.

More particularly, as the positional relation between a plane formed by the optical axis of the objective lens indicated by a line 523 in FIG. 10 and the optical axis after the deflection by the reflecting mirror and the distance measuring field, the distance measuring field is disposed near the plane 523 substantially parallel thereto and the inclination with respect to this plane 523 is made greater away from the plane 523. Also, the direction of the inclination is a sector opening upwardly on the film surface shown in FIG. 10 when, as in the present embodiment, the reflecting mirror downwardly deflects the optical axis of the objective lens.

FIG. 4 shows a photoelectrical changing element taking the above-described matters into account.

The above-described embodiment is one in which, as shown in FIG. 4, two light quantity distributions regarding the object image are formed above and below the photoelectrical changing element 11 and the deviation thereof in the vertical direction is detected. In a focus detecting apparatus of such a construction, focus detection is possible only for an object having light and shade in the vertical direction like a lateral line and focus detection is impossible for an object having light and shade in the horizontal direction like a vertical line.

Figure 12:
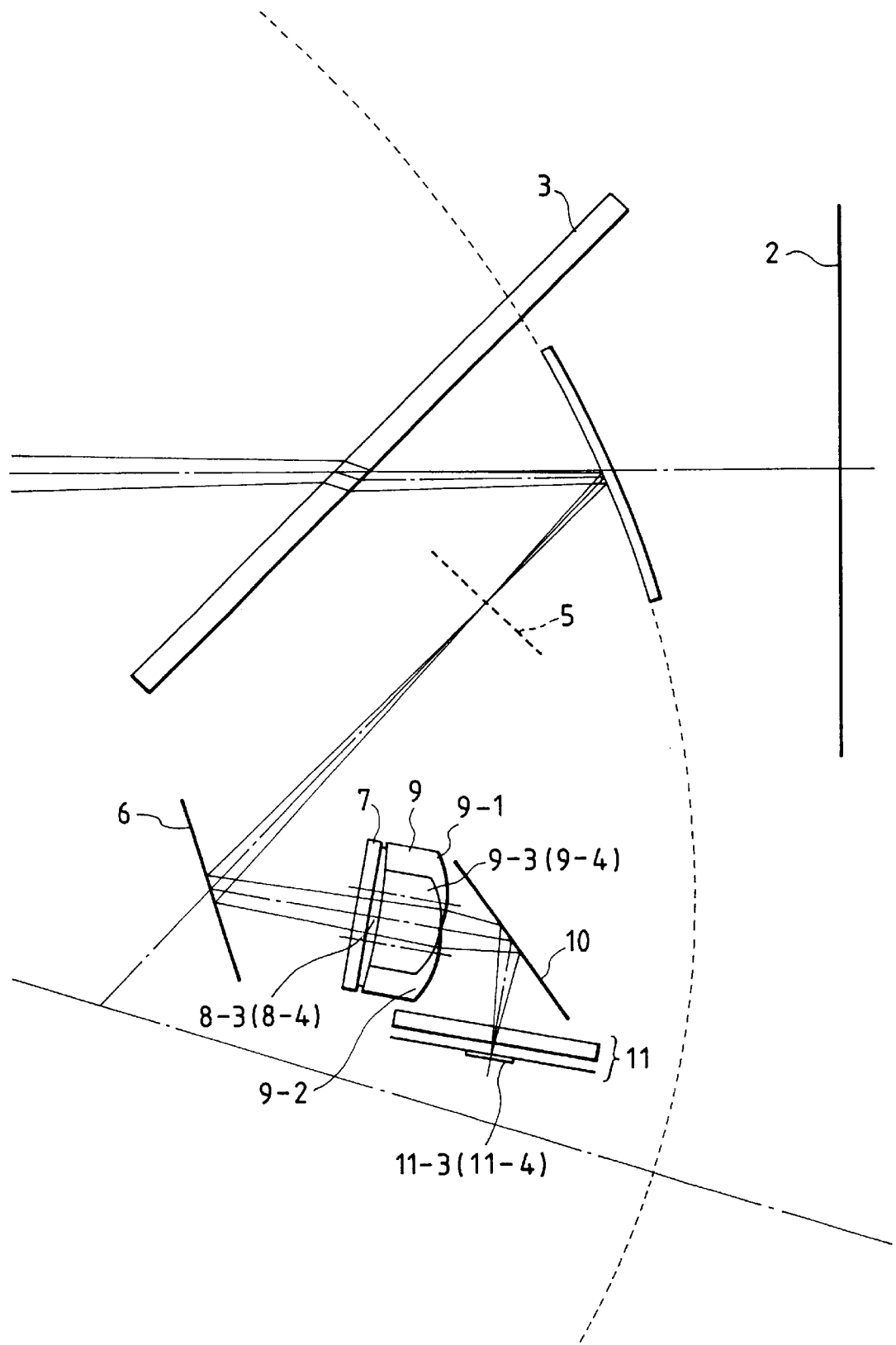
FIG. 12 is an enlarged illustration of a portion of a focus detecting apparatus according to Embodiment 2 of the present invention.

FIG. 12 is a schematic view of the essential portions of Embodiment 2 of the present invention improved in this point. This embodiment differs from Embodiment 1 of FIG. 2 in that two lenses 9-3 and 9-4 are newly disposed in the secondary imaging system 9 comprising two lenses 9-1 and 9-2 in a direction orthogonal thereto, and openings 8-3 and 8-4 corresponding thereto are provided in the aperture 8 and area sensors 11-3 and 11-4 corresponding thereto are provided on the photoelectrical changing element 11, and is the same as Embodiment 1 in the other points.

In FIG. 12, in order to avoid cumbersomeness, the openings 8-1, 8-2 in the aperture 8, the area sensors 11-1, 11-2 of the photoelectrical changing element 11 and the light beams 12-1, 12-2 shown in FIG. 2 are not shown.

Figure 13:
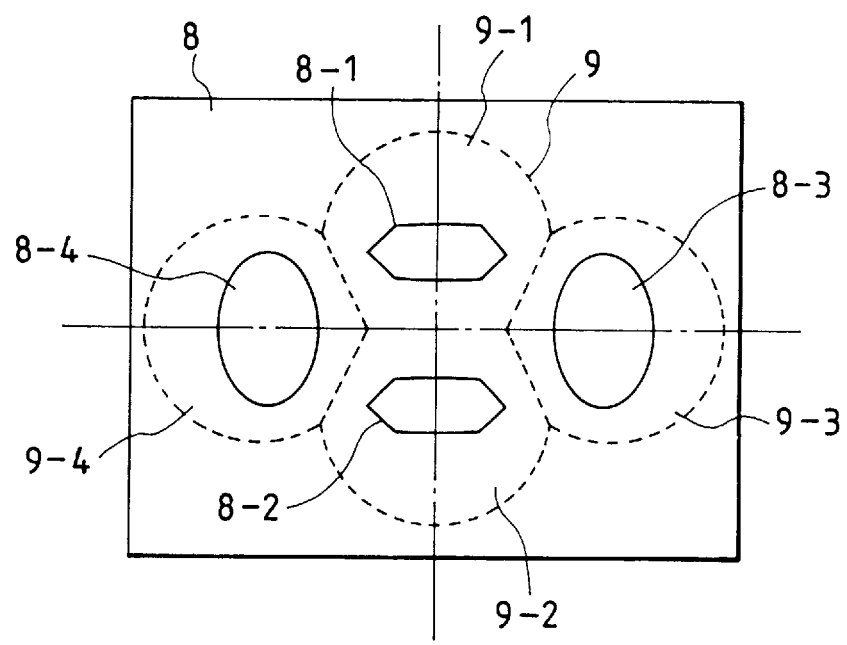
FIG. 13 is an illustration showing an aperture and a secondary imaging system in Embodiment 2 of the present invention.

FIG. 13 shows the shape of the openings in the aperture 8 in Embodiment 2. In FIG. 13, the reference numerals 8-3 and 8-4 designate the newly added openings, and the reference numerals 9-3 and 9-4 denote the two lenses disposed correspondingly thereto and rearwardly thereof and constituting the secondary imaging system 9.

In the present embodiment, the openings 8-3 and 8-4 in the aperture 8 of FIG. 13 are disposed more outside, as compared with the openings 8-1 and 8-2, so as to introduce the light in the area around the pupil of the objective lens 101. By adopting such a construction, the so-called base line length during focus detection is made greater.

The focus detecting system by the openings 8-3 and 8-4 in the aperture 8 newly added in the present embodiment can enhance focus detection accuracy for objective lenses of light F-numbers. Of course, it is also possible to make the positions from the center at which the openings 8-3 and 8-4 in the aperture 8 are disposed the same as the positions of the openings 8-1 and 8-2, and design the system such that for an object equal in focus detection accuracy but having a distribution of light and shade in only one of the vertical and horizontal directions, focus detection is always made possible irrespective of the brightness of the objective lens.

Figure 14:
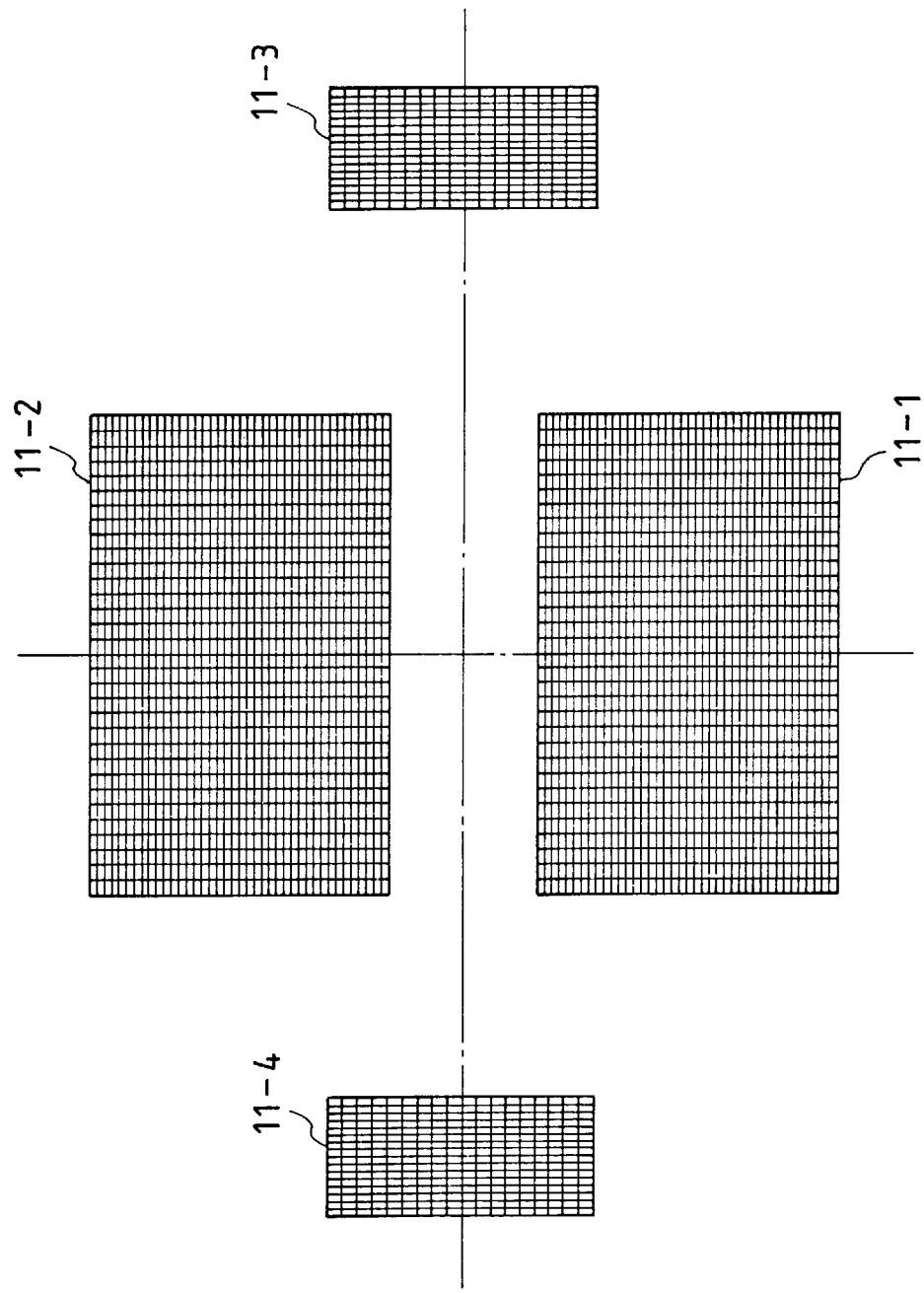
FIG. 14 is an illustration showing a photoelectrical changing element in Embodiment 2 of the present invention.
Figure 15:
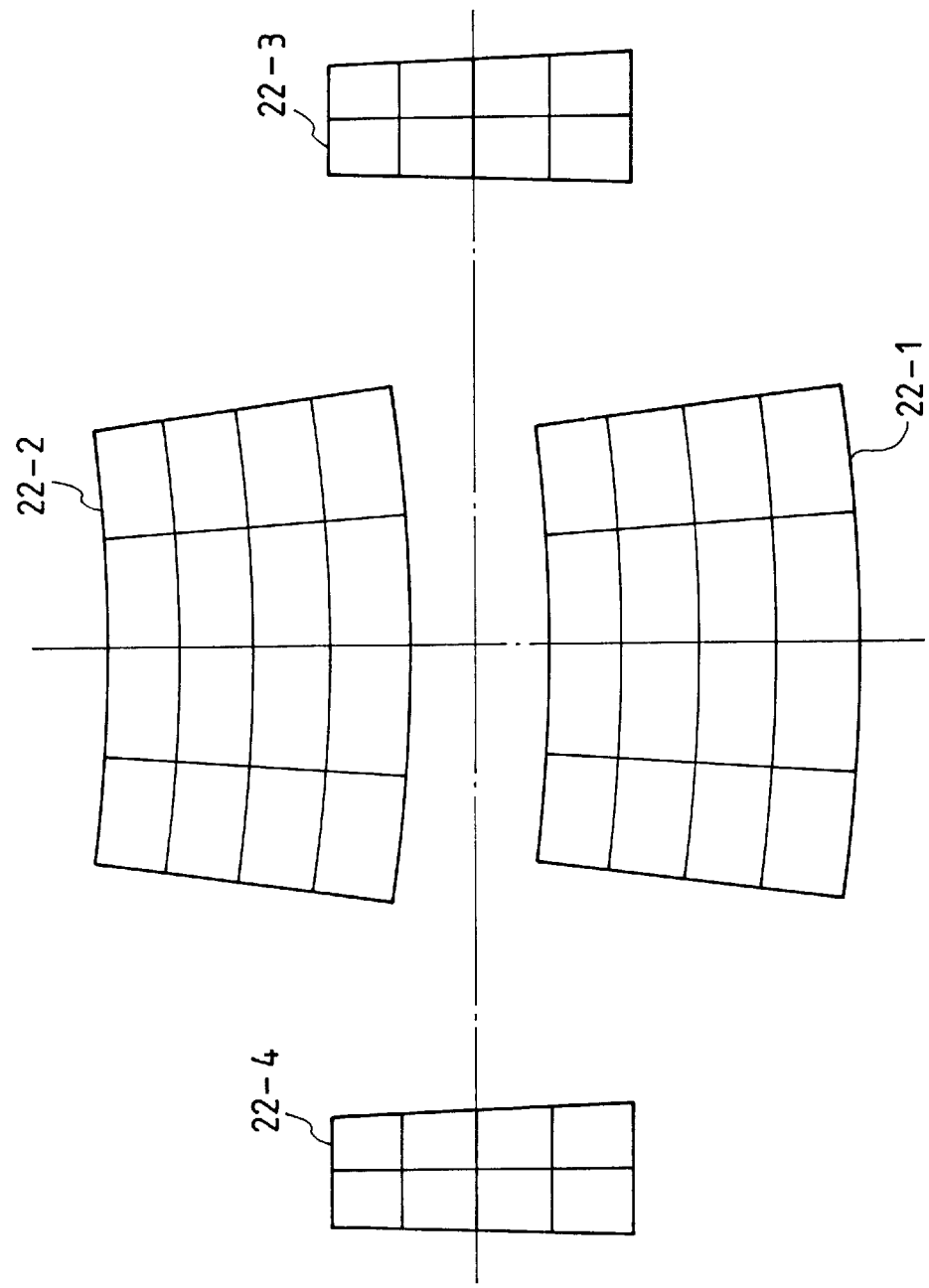
FIG. 15 is an illustration showing images on the photoelectrical changing element in Embodiment 2 of the present invention.
Figure 16:
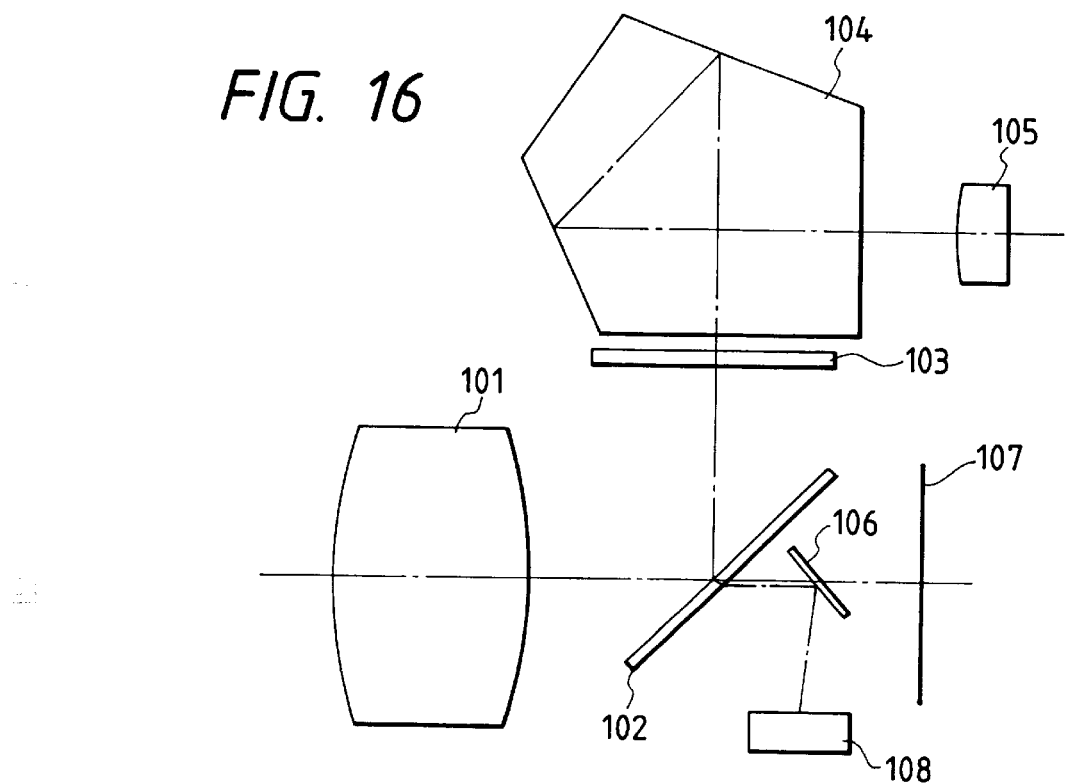
FIG. 16 is a schematic view showing a camera having a focus detecting apparatus according to the prior art.
Figure 17:
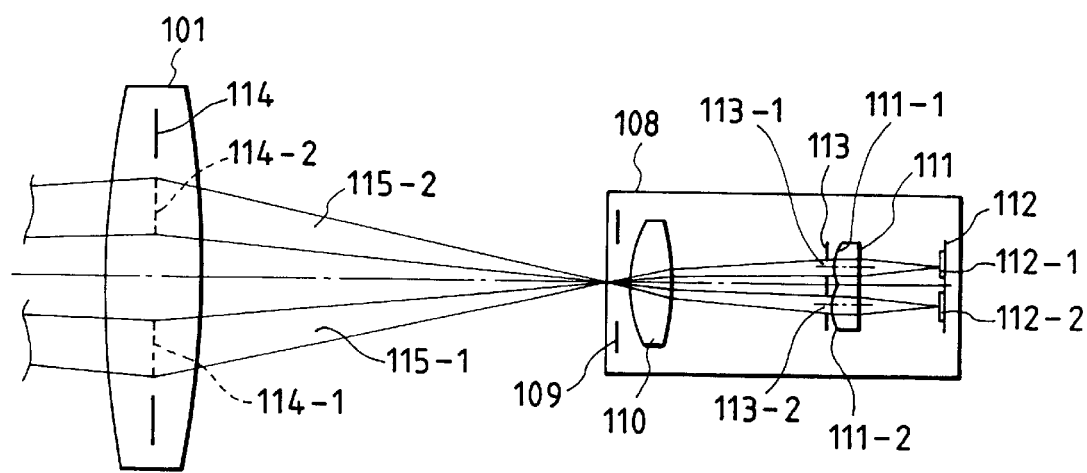
FIG. 17 is a schematic view showing the focus detecting apparatus according to the prior art.

FIG. 14 shows area sensors 11-3 and 11-4 on the photoelectrical changing element 11 on which light quantity distributions are formed by secondary imaging lenses 9-3 and 9-4. FIG. 15 is a view similar to FIG. 6 but showing the projected image of the grating figure on the photoelectrical changing element 11.

As can be seen from FIGS. 14 and 15, in the present embodiment, field areas corresponding to the area sensors 11-3 and 11-4 for detecting the phase difference between object images in the horizontal direction are set small relative to field areas corresponding to the area sensors 11-1 and 11-2 for detecting the phase difference between object images in the vertical direction. This is for the following reason.

In the present embodiment, it is necessary to make the distortions of the rectangular images 22-1 and 22-2 of FIG. 15 or the difference therebetween and the distortions of the rectangular images 22-3 and 22-4 or the difference therebetween small at one time, but it is not always easy to make these compatible because the directions in which the difference between the two images particularly poses a problem are orthogonal to each other. The light beams forming the two object images are reflected by a common area in the first reflecting mirror and the second reflecting mirror and therefore, it is also difficul t to cope with this by contriving the shapes of these reflecting mirrors. In such a situation, it is very effective to set the direction in which the phase difference of one of the two sets of object images is detected short.

Also , by such a construction, the photoelectrical changing element 11 can avoid becoming extremely large and it becomes possible to dispose the focus detecting apparatus easily even in a limited space in a camera. Further, to effect focus detection in any two-dimensional area, an enormous calculating process is necessary as compared with the focus detecting apparatus according to the conventional art, and it is advantageous in effecting quick focus detection to make the pixels of the sensors necessarily minimum.

While the focus detecting apparatus of the phase difference detection type has hitherto been described, the present invention is not restricted thereto, but is also effective for a focus detecting apparatus of other type effecting secondary imaging, for example, an apparatus for detecting the focus state from the sharpness of an object image. On the other hand, the present invention is suitably used when extending an area in which focus detection is possible to a two-dimensional continuous area, but even if the present invention is applied to a case wherein a plurality of conventional art focus detecting apparatuses using onedimensional line sensors are disposed, the focus detecting position can be set more marginally.

According to the present invention, as described above, there can be achieved a focus detecting apparatus in which each element of optical means for focus detection provided on the image plane side of an objective lens (a phototaking lens) is appropriately set to thereby extend an area in which focus detection is possible particularly to the upper portion in a phototaking range in any area or/and a plurality of areas in vertical and horizontal directions in a phototaking field even if distortion is present in a focus detecting optical system and which can effect focus detection highly accurately at any point in a continuous two-dimensional area, and an optical apparatus using the same.

Besides, according to the present invention, focus detection accuracy is maintained and yet the area in which focus detection is possible can be markedly enlarged. Also, focus detection is extended to a two-dimensional area and focusing can be easily effected on an object at any desired position, and there can be obtained the effect that the degree of freedom of the setting of a composition when phototaking or observation is effected is increased.

What is claimed is:

1. A focus detecting apparatus comprising:

an optical unit provided on an image plane side of an objective lens for detecting a focus state of the objective lens, said optical unit forming a plurality of light quantity distributions regarding an object image by the use of light beams passed through different areas of the pupil of the objective lens;

a photoelectrical changing unit having a plurality of elements for outputting a relative positional signal between the plurality of light quantity distributions; and a circuit for detecting a focus state of the objective lens in one or more areas in a phototaking field by using the signal from said photoelectrical changing unit;

said optical unit comprising a reflecting mirror having a light condensing property for reflecting a light beam from the objective lens to form an object image on a predetermined surface, a secondary imaging lens having at least a pair of lenses for causing the object image formed on the predetermined surface to be reimaged on said photoelectrical changing unit, and a pair of apertures having aperture portions respectively corresponding to the pair of lenses, wherein when said photoelectrical changing unit is reversedly projected by said secondary imaging lens and said reflecting mirror, the elements corresponding to the direction of arrangement of the pair of apertures of said photoelectrical changing unit are arranged so that a peripheral portion of the elements is not parallel to the center of the arrangement of the elements.

2. The focus detecting apparatus of claim 1, wherein the reflecting surface of said reflecting mirror has a shape comprising a portion of a curved surface formed by a quadratic curve being rotated about an axis.

3. The focus detecting apparatus of claim 2, wherein the reflecting surface of said reflecting mirror has a shape which does not include the rotational axis and vertex of the curved surface formed by the quadratic curve being rotated about an axis.

4. The focus detecting apparatus of claim 2, wherein the reflecting surface of said reflecting mirror is a spheroidal surface formed by an ellipse being rotated about an axis.

5. The focus detecting apparatus of claim 4, wherein one of two focuses of the spheroidal surface is on or near a ray of light incident on the spheroidal surface along the optical axis of the objective lens or an extension thereof, and the other of the two focuses is on or near a ray of light reflected by the spheroidal surface or an extension thereof.

6. The focus detecting apparatus of claim 1, wherein at least one other reflecting mirror is disposed between said reflecting mirror and said photoelectrical changing unit.

7. The focus detecting apparatus of claim 1, wherein a main mirror for directing the light beam from the objective lens to a finder optical system is disposed between said reflecting mirror and the objective lens, and said reflecting mirror reflects the light beam transmitted through said main mirror in a direction opposite to the direction of reflection by said main mirror.

8. The focus detecting apparatus of claim 1, wherein the light incidence pupil of said secondary imaging lens and the pupil of the objective lens are in a substantially conjugate relation with each other, and said reflecting mirror comprises a spheroidal mirror having the light incident pupil position and the pupil position of the objective lens as its focuses.

9. The focus detecting apparatus of claim 8, wherein said spheroidal mirror causes the object image formed by the objective lens to be reducedly formed on the predetermined surface.

* * * * *

UNITED STATES PATENT AND TRADEMARK OFFICE
CERTIFICATE OF CORRECTION

PATENT NO. : 5,771,413

DATED : June 23, 1998

INVENTORS : YASUO SUDA, ET AL.

It is certified that error appears in the above-identified patent and that said Letters Patent is hereby corrected as shown below:

COLUMN 1:

line 64, "1131-1" should read --113-1--.

COLUMN 2:

line 18, "of" should be deleted.

COLUMN 3:

line 43, "random therefore," should read --random. Therefore,--.

COLUMN 4:

line 8, "on" should read --on the--.

COLUMN 5:

line 3, "focusdetecting" should read --focus detecting--;
    line 31, "areas" should read --area--;
    line 62, "areas" should read --area--; and

UNITED STATES PATENT AND TRADEMARK OFFICE
CERTIFICATE OF CORRECTION

PATENT NO. : 5,771,413

DATED : June 23, 1998

INVENTORS : YASUO SUDA, ET AL.

It is certified that error appears in the above-identified patent and that said Letters Patent is hereby corrected as shown below:

COLUMN 5 (cont'd):

line 63, "areas" should read --area--.

COLUMN 12:

line 2, "onedimensional" should read --one-dimensional--.

Signed and Sealed this

Twenty-third Day of February, 1999

Attest:

Q. TODD DICKINSON

*Attesting Officer*     *Acting Commissioner of Patents and Trademarks*